United States Patent [19]

Wollam

[11] Patent Number: 4,978,259

[45] Date of Patent: Dec. 18, 1990

[54] APPARATUS AND METHOD FOR DEBURRING METAL STRIP

[75] Inventor: Carl A. Wollam, Cortland, Ohio

[73] Assignee: Alcan International Limited, Montreal, Canada

[21] Appl. No.: 190,478

[22] Filed: May 4, 1988

[51] Int. Cl.$^5$ .............................................. B23C 3/12
[52] U.S. Cl. .................................... 409/132; 409/138; 83/869; 83/914; 407/7
[58] Field of Search ................. 83/914, 869, 26, 13; 409/138, 139, 140, 131–132; 407/7

[56] References Cited

U.S. PATENT DOCUMENTS 3,377,896  4/1968  De Corta ........................ 83/914 X
3,691,898  9/1972  Held ................................... 409/138
4,616,966  10/1986  Ohyama .......................... 409/138 X
4,799,836  1/1989  Kurisu et al. ....................... 409/138

Primary Examiner—Frank T. Yost
Assistant Examiner—Rinaldi Rada
Attorney, Agent, or Firm—Cooper & Dunham

[57] ABSTRACT

A device for on-line deburring of metal strip advancing continuously along a defined path, including a rotary knife having an inwardly facing cutting edge, and structure supporting the knife for rotation such that the cutting edge engages and shaves burr from a strip edge at a location beyond the axis of knife rotation, in the direction of strip advance. In a deburring method using such a knife, the knife is rotated by its engagement with the strip edge, in such direction as to throw the shaved burr laterally outwardly away from the strip.

5 Claims, 4 Drawing Sheets

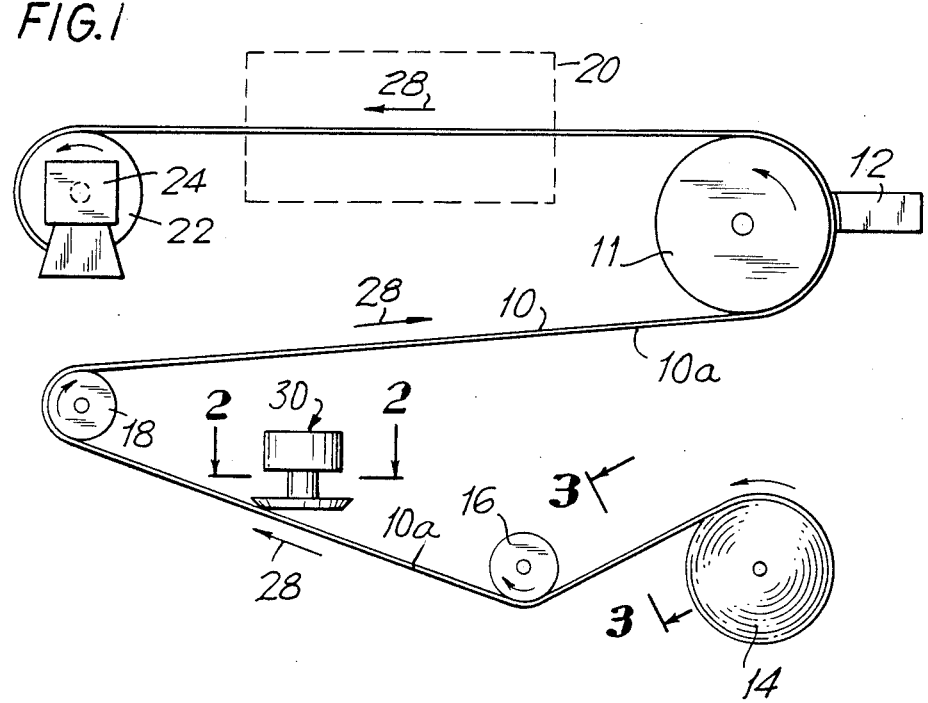
FIG.1
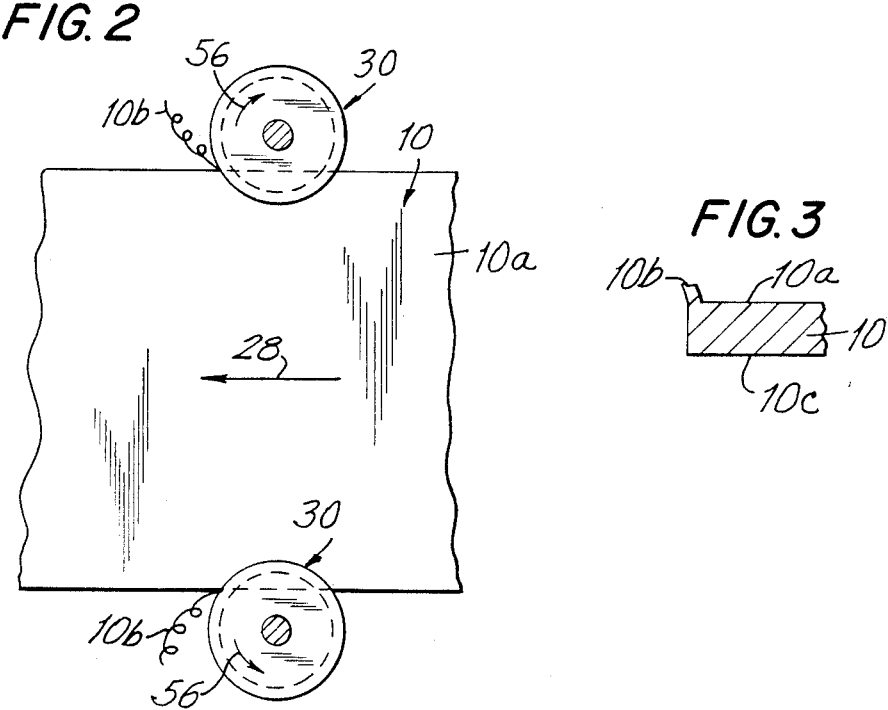
FIG.2
FIG.3

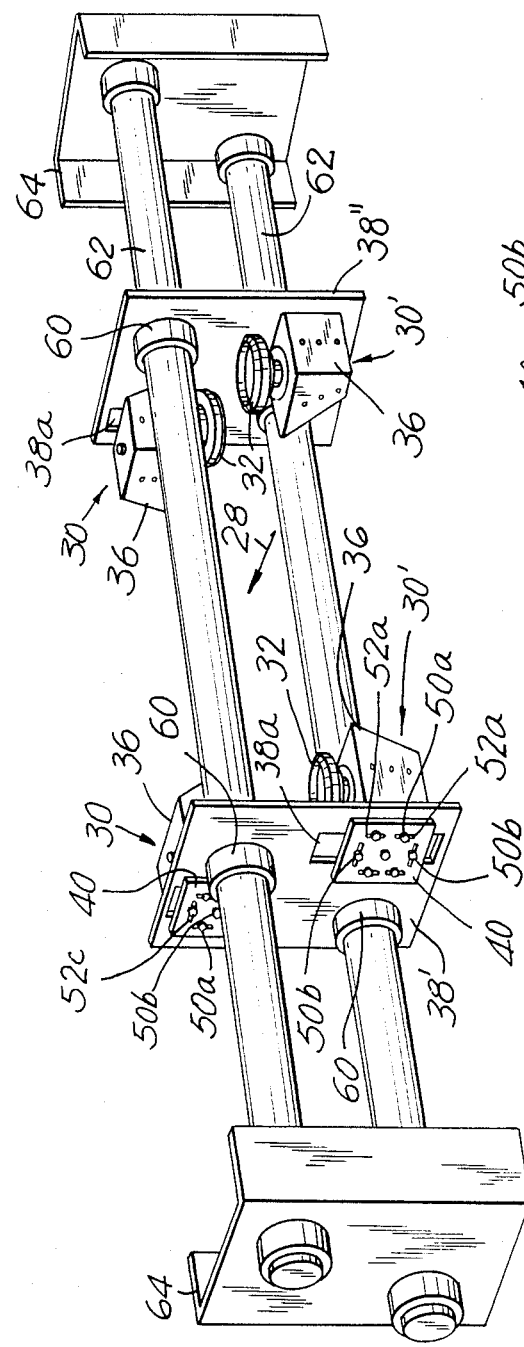
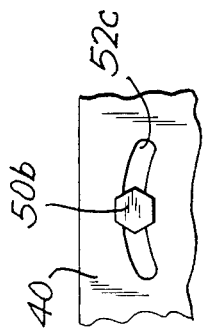

APPARATUS AND METHOD FOR DEBURRING METAL STRIP

BACKGROUND OF THE INVENTION

This invention relates to apparatus and methods for removing burr from edges of metal strip.

In the commercial-scale manufacture of many kinds of sheet metal articles, illustratively exemplified by siding and ceiling panels and venetian blind slats, a relatively wide strip of sheet metal is initially slit longitudinally into plural narrower strips which are thereafter subjected to various process line operations commonly including the painting or other coating of one or both strip surfaces. When metal strip is slit into narrower widths on a conventional slitting line using rotary knives, a burr is commonly formed on each slit edge of the strip. The burr projects for several thousandths of an inch from and perpendicular to the strip surface, in an upward or downward direction depending on the arrangement of knives in the slitter.

Presence of the burr along one or both strip edges can be deleterious in subsequent operations to which the strip is subjected. For instance, in a coating line in which paint is applied to the slit strip by conventional urethane-covered rollers, the burr cuts into the roller covering, causing damage. Again, in coating procedures as disclosed, for example, in U.S. Pat. Nos. 4,356,216, 4,356,217, and 4,387,123, wherein the strip is advanced past an extended closely proximate metal plate or like surface immediately downstream of the locality of paint application, the burr galls and thereby damages the plate face. Accordingly, diverse types of devices have heretofore been proposed for deburring (removing burr from) edges of metal strip, e.g. ahead of locations in process lines at which it is desired that the strip be burr-free.

SUMMARY OF THE INVENTION

The present invention, in a first aspect, contemplates the provision of new and improved apparatus for deburring metal strip. This apparatus, in accordance with the invention, broadly comprises the combination, with means for advancing a metal strip continuously along a defined path, of a rotary knife element having an inwardly facing annular cutting edge for cutting burr from an edge of a metal strip, and means for freely rotatably mounting the knife element adjacent the path in a position for partially overlying an edge portion of a metal strip advancing in the path, with the cutting edge positioned for rotation about an axis disposed laterally outwardly of the path and in a plane of rotation obliquely intersecting the path such that the cutting edge engages an edge of an advancing metal strip in the path at a location beyond the aforementioned axis in the direction of strip advance. The knife element is rotatably driven, by force exerted thereon by engagement of the cutting edge with an edge of the advancing strip as aforesaid, in an angular direction such as to carry burr, cut from the strip, outwardly away from the strip path.

The term "inwardly facing," as herein used to describe the cutting edge, refers to a cutting edge that faces inwardly toward its geometric center, i.e. toward the axis of knife rotation, rather than (as is conventional in rotary knives) outwardly away from the center or axis of rotation. Conveniently or preferably, the knife element is generally disc-shaped with a raised rim that is bevelled outwardly to expose and define the inner edge of the rim as the cutting edge.

The deburring device constituted of the knife element and its mounting means is advantageously simple, reliable and effective, requiring no separate motor (the motive force for the knife being provided by the advance of the strip itself) and being capable of installation and use in virtually any type of process line in which deburring is desired. Particularly important features of the invention reside in the inwardly facing orientation of the cutting edge, together with the oblique intersection of the strip path and plane of knife rotation, and the disposition of the knife element for strip edge - cutting edge contact at a location beyond (downstream of) the axis of knife rotation, in the direction of strip advance. These features result in clean shaving of the burr from the strip and impart to the knife a direction of strip-driven rotation that carries the cut burr entirely away from the path of strip advance so as to avoid the detrimental presence of burr shavings on the strip surface beyond the deburring locality. Stated more generally, it is found that cutting of the burr by intersection of the burred strip edge with a rotary knife beyond the knife axis provides very superior operation, as compared to that afforded by arrangements in which the burred strip edge is engaged by a rotary knife edge ahead of the knife axis.

The knife is disposed either above or below the strip (in the case of a strip advancing along a nonvertical path), depending on the direction in which the burr projects from the strip; hence expressions such as "overlying," "horizontal," and "vertical" herein will be understood to be used only to indicate relative positions. Also, a deburring knife and associated mounting means in accordance with the invention may be disposed on each side of a strip path so as to remove burr simultaneously from both longitudinal edges of an advancing strip. Advantageously, the mounting means or each mounting means is adjustable to vary the position (and in particular the angle) of the knife element or elements relative to the strip path, thereby, for example, to enable variation in depth of cut and, if desired, to leave the strip with a tapered or bevelled edge.

In a second aspect, the invention contemplates the provision of a new and improved method of deburring metal strip advancing continuously along a defined path, comprising engaging an edge of the strip to be deburred with an inwardly facing annular cutting edge of a rotary knife element while supporting the knife adjacent the path for rotation about an axis disposed laterally outwardly of the path and in a plane obliquely intersecting the path such that the cutting edge-strip edge engagement occurs at a location beyond the axis in the direction of strip advance and the knife is rotated by its cutting edge engagement with the advancing strip.

Further features and advantages of the invention will be apparent from the detailed description hereinbelow set forth, together with the accompanying drawings.

BRIEF DESCRIPTION OF THE DRAWINGS

FIG. 1 is a highly simplified schematic elevational view of a process line for coating metal strip, incorporating the apparatus of the invention in a particular form and illustrating the practice of the present method therewith;

FIG. 2 is a somewhat enlarged fragmentary view taken as along the line 2—2 of FIG. 1;

FIG. 3 is a greatly enlarged fragmentary cross-sectional view of the metal strip taken as along the line 3—3 of FIG. 1;

FIG. 6 is a perspective view of a deburring assembly embodying the invention and including four of the deburring devices of FIGS. 4 and 5;

FIG. 7 is an enlarged fragmentary elevational view of a portion of the device of FIG. 6;

DETAILED DESCRIPTION

Figure 4:
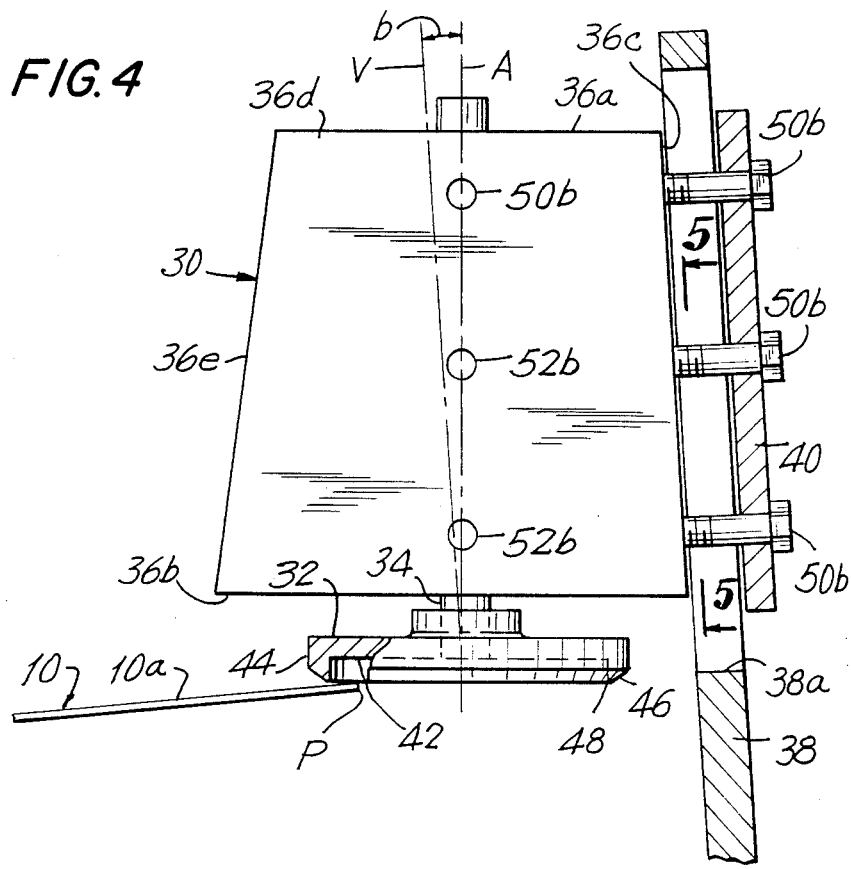
FIG. 4 is an end elevational view of one deburring device (knife element and associated knife-mounting unit) for use in the apparatus of FIG. 1.

For purposes of illustration the invention will be described as embodied in apparatus incorporated in a strip-coating line of a type shown in one or more of the aforementioned U.S. patents, wherein a metal strip 10 to be coated is trained over an axially horizontal backup roll 11 which guides the strip past a coating head 12. The coating head applies paint to the facing, exposed major surface 10a of the strip, and has a smooth surface extending downstream of the locality of paint application in closely proximate relation to the paint-bearing strip surface.

The complete coating line schematically represented in FIG. 1 comprises a supply reel 14 from which the strip to be coated is unwound, guide rolls 16 and 18 over which the strip is trained as it advances to the backup roll 11, a curing or drying zone 20 of conventional character through which the freshly coated strip passes, and a take-up reel 22 driven by a motor 24. This motor, together with the reels 14 and 22 and rolls 16, 18 and 11, cooperatively constitute means for continuously advancing the strip lengthwise along a defined path (from reel 14 to reel 22) in the direction indicated by arrows 28. The reels and rolls are supported by conventional means (not shown) for rotation about horizontal axes parallel to each other.

The strip 10 initially coiled on the supply reel 14 is an elongated, typically cold-rolled strip of sheet metal, for example aluminum (i.e. pure aluminum metal or an aluminum-based alloy), which has previously been slit longitudinally to a desired width from a wider strip in a conventional rotary-knife slitter. This slitting operation produces a burr 10b (FIG. 3) on one or both longitudinal edges of the strip 10, projecting for a distance of some thousandths of an inch from and perpendicular to one or the other strip major surface, depending on the arrangement of the slitter knives; in FIGS. 1-3, it is assumed that the burr 10b projects from the strip major surface 10a to which paint is applied by the coating head 12, but it could just as well project from the other strip major surface 10c. If the strip passing the coating head bears such an edge burr, the burr will gall the coating head surface, damaging that surface with resultant undesired production of irregularities in the applied coating.

The apparatus of the present invention, in the embodiment illustrated in FIGS. 1 and 2, includes a pair of devices 30 (only one being visible in the view of FIG. 1) for respectively shaving the burr from the two longitudinal side edges of the advancing strip 10 ahead of the locality at which the strip passes the coating head 12, so that the strip at the latter locality is burr-free. These devices 30 are respectively positioned to engage the strip edges on opposite sides of a portion of the strip path, between guide rolls 16 and 18, at which the strip major surfaces are essentially planar and the strip is advancing upwardly at an oblique angle to the horizontal, with surface 10a facing up. Of course, if the strip has a burr on only one side edge (i.e. if it has been cut by a slitter knife only on one side), only a single device 30 need be used.

Figure 5:
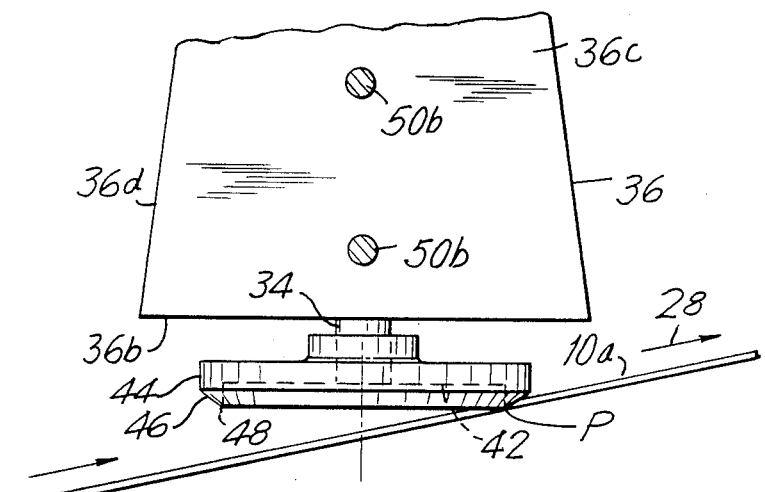
FIG. 5 is a fragmentary side elevational view of the knife element and mounting unit of FIG. 4, taken as along the line 5—5 of FIG. 4.

As further shown in FIGS. 4 and 5, each of the devices 30 includes a circular or disc-shaped knife element 32 secured to a shaft 34 for rotation about its geometric axis A, a housing 36 containing bearings (not shown) that support the shaft for free rotation about axis A, and mounting structure 38, 40 adjustably supporting the housing 36 in a preselected position relative to the path of the strip 10. The shaft 34, housing 36 with its contained bearings, and structure 38, 40, together constitute mounting means for the knife element of each device 30.

The knife elements 30 are fabricated of a metal selected and appropriately prepared or treated so as to be capable of shaving burr from the metal strip 10 with a desirably long surface life. Material selection for and preparation of such knives, for cutting burr from any given metal strip, will be readily apparent to persons of ordinary skill in the art.

As best seen in FIGS. 4 and 5, each knife element 32 has a flat circular face 42 opposed to and perpendicular to its associated shaft. A circular rim 44 projects from this face and has its outer land 46 bevelled to expose and define the inner edge 48 of the rim as an inwardly facing cutting edge, viz. a cutting edge that faces toward the geometric axis A of the knife element (which is also the geometric axis of the cutting edge) so as to shave a metal strip edge advancing into contact with the edge 48 from within a notional cylinder projected from edge 48.

More particularly, each knife element 32 is supported, by its mounting means, above and in partially overlying relation to an edge portion of the advancing strip 10, with the axis of rotation A disposed laterally outwardly of the path of the strip (FIGS. 2 and 4) and the plane of rotation of the cutting edge 48 intersecting the strip path obliquely (FIGS. 1, 4 and 5) at a location beyond the axis A in the direction of strip advance, such that the edge 48 engages the advancing strip edge at the latter location. In the illustrated embodiment of the invention, the axis A of each knife element 32 is oriented at a small angle to the vertical (as hereinafter further described) and the plane of rotation of the cutting edge 48 is thus oriented at the same small angle to the horizontal, while the upwardly facing surface 10a of the advancing strip 10 (in that portion of the strip path at which the devices 30 are disposed) lies essentially in a plane oriented at a shallow oblique angle to the horizontal, with the strip moving upwardly therein. These orientations are so chosen that the plane of rotation of the cutting edge 48 intersects the strip path (i.e., the plane of surface 10a) obliquely as viewed in elevation both transversely of (FIG. 4) and parallel to (FIG. 5) the direction of strip advance.

The oblique intersection between the planes of cutting edge rotation and of surface 10a is so located that it crosses the adjacent strip edge at a point P (FIG. 2) spaced from axis A by a distance equal to the radius of the cutting edge 48. Consequently, although the cutting edge 48 of each knife element overlies the subjacent strip edge at two points, N and P, respectively ahead of and beyond the axis A, it engages the strip edge at and only at point P, viz. at the location of the line of intersection of the strip path plane and the plane of cutting edge rotation. That is to say, each strip edge is engaged by the trailing edge (at downstream point P) of one of the knife elements, rather than by the leading edge (at upstream point N, first passed by the strip).

Figure 8A:
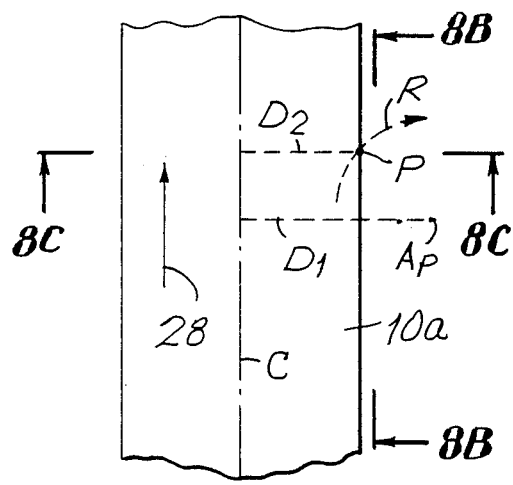
FIG. 8A is a diagrammatic plan view taken in the plane of the surface of the strip to be shaved, in the vicinity of a knife element, illustrating certain geometrical relationships.
Figure 8B:
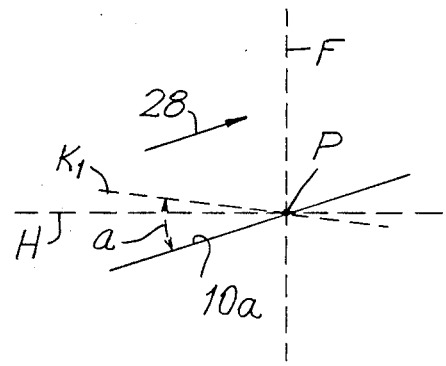
FIGS. 8B and 8C are diagrammatic elevational views respectively taken along lines 8B—8B and 8C—8C of FIG. 8A, in further illustration of certain geometrical relationships.
Figure 8C:
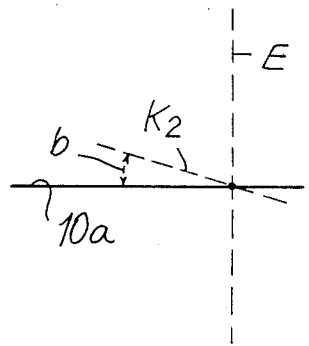

The positional relationships between the strip to be shaved and a knife element 32, in the described embodiments of the invention, may be more precisely defined with reference to FIGS. 8A, 8B, and 8C. FIG. 8A is a diagram in the plane of the major surface 10a of a strip to be shaved as the strip advances in the direction indicated by arrow 28 past one of the aforementioned knife elements. The strip, as already mentioned, is at this point moving obliquely upwardly (at a small acute angle to the horizontal); typically, and in the example herein described, the strip has no lateral tilt, and hence every line contained in the plane of surface 10a and perpendicular to the longitudinal center line C of the strip is itself horizontal. In FIG. 8A, $A_p$ is the point intersection of the knife rotational axis A with the plane of strip surface 10a; $D_1$ is the line perpendicular from $A_p$ to C; $D_2$ is the line perpendicular from point P (defined above) to C; and arrow R indicates the instantaneous direction of rotation of the knife element at point P. In accordance with the invention, $D_1$ is longer than $D_2$ (i.e., the rotational axis of the knife is spaced outwardly of the adjacent strip edge, on which P lies), and $D_2$ is spaced "downstream" from $D_1$ in the direction of arrow 28; consequently, the rotational direction R of the knife element at P (where the burr is shaved from the strip edge) is outward with respect to the strip.

FIG. 8B is a diagram in the vertical plane containing the strip edge on which P lies, this plane being parallel to the strip center line C. The figure shows the upward direction of travel of the strip 10 (represented by surface plane 10a) relative to the horizontal H. F represents the intersection, with the FIG. 8B plane, of the vertical plane containing line $D_2$, while $K_1$ represents the intersection, with the FIG. 8B plane, of the plane of rotation of the cutting edge of the knife. In accordance with the invention, $K_1$ and 10a intersect at P, and define between them a small acute angle a opening in the direction opposite to the direction 28 of strip travel. Typical or currently preferred values for angle a are between about 10° and about 20°. Although $K_1$ is shown as slightly divergent from the horizontal H, $K_1$ may coincide with or even tilt the other way from the horizontal as viewed in FIG. 8B, depending on the upward slope of 10a, so as to provide an appropriate value of angle a, which is always positive (greater than 0°).

FIG. 8C is a diagram in the vertical plane containing $D_2$, viz. the plane represented by F in FIG. 8B. E represents the intersection of the vertical plane of FIG. 8B with the plane of FIG. 8C, and $K_2$ represents the intersection of the rotational plane of the knife cutting edge with the plane of FIG. 8C. $K_2$, of course, intersects with 10a at P. Preferably in at least many instances, in accordance with the invention, $K_2$ and 10a define between them a small positive (greater than 0°) acute angle opening toward the center line of the strip.

Details of the mounting arrangement for each of the knife elements 32 to enable provision of, and selection of desired values of angles a and b in, the above-described geometrical relationships, are shown in FIGS. 4 and 5. As there illustrated, each housing 36 is in the form of a block having a top surface 36a, a bottom surface 36b (below which the shaft 34 protrudes to carry the knife element 32), and four flat side surfaces 36c, 36d, 36e, and 36f. The four side surfaces would be at right angles to each other if viewed in cross section perpendicular to the axis A of knife rotation, but they slope convergently upward at respectively different angles to axis A (e.g., at 2.5°, 5°, 7.5°, and 10° respectively).

The member 38 is a bracket, stably supported in stationary relation (during use) to the path of strip advance, having opposed parallel major vertical faces and a vertically elongated opening 38a of substantial width but narrower than any side surface of the housing or block 36. The member 40 is a vertically oriented plate, secured to one face of the member or bracket 38 (by a plurality of bolts 50a, shown in FIG. 6, preferably inserted through vertically elongated slots 52a provided in the member or plate 40 to enable some degree of vertical adjustment of the plate relative to the bracket), and extending across opening 38a.

The housing or block 36 is disposed with one of its sloping side surfaces disposed flat against the opposite face of the bracket 38, i.e. opposed to and in register with plate 40, to which it is secured by means of three vertically spaced bolts 50b extending through the opening 38a into threaded holes 52b formed in the side surface of the block. Three such holes 52b are provided in each block side surface. Arcuate slots 52c (FIG. 7) are provided in plate 40 for the upper and lower ones of bolts 50b, to enable some amount of angular adjustment of block 36 relative to plate 40 (about the axis of the central one of bolts 50b, which axis is transverse to rotational axis A), this extent of angular adjustment being permitted by the width of opening 38a.

As will now be understood, when the block 36 is mounted on the bracket 38 in abutting relation to a vertical face of the bracket as shown in FIG. 4, the rotational axis A will always slope upwardly and outwardly away from the strip 10 at an angle b to the vertical V which is determined by and equal to the upward slope of the bracket-engaging side surface (36c, d, e, or f) of the block relative to axis A. The angle b defined in FIG. 8C is, of course, equal to this angle b. The differing slopes of the four side surfaces of the block thus enable the operator to select any desired one of four different values of b (viz., 2.5°, 5°, 7.5°, and 10°, in the example given above). Also, the angle a is adjustable (for any given angle of upward slope of the strip) through a continuous range of angles determined by the extent of arcuate slots 52c, such adjustment being effected by turning the block 36 relative to the plate 40 about the central one of bolts 50b before the bolts 50b are tightened.

In the embodiment of FIGS. 1 and 2, utilizing two identical devices 30 for respectively shaving burr from the opposite longitudinal side edges of a strip 10, the two devices are aligned with each other across the width of the strip path. Thus, assuming that they are positioned at the same elevation and at equivalent orientations relative to the strip, the respective points P of contact of the knife edges 48 with the opposite edges of the strip 10 will be in register with each other.

The operation of the described apparatus, and the practice of the method of the invention therewith, may now be readily explained. With a strip 10 (having a burr 10b projecting from its surface 10a along both longitudinal side edges of the strip) continuously advancing along the defined strip path in the direction of arrows 28, and with the two devices 30 positioned as illustrated in the drawings, the cutting edges 48 of the two knife elements 32 respectively engage the burred side edges of the strip at points P downstream of the axes A of knife rotation. This contact between the cutting edges of the knife elements and the moving strip provides a force which causes the freely rotatably mounted knife elements to rotate in the respective directions indicated by arrows 56 (FIG. 2). That is to say, the motion of the advancing strip itself drives the knives in continuous rotation.

At the location of the devices 30 between guide rolls 16 and 18 in the path of strip advance, the burr 10b is projecting upwardly on both sides of the strip; and since the knife elements are disposed above the strip, the burred strip edges contact the knife cutting edges at the inside, downstream points P, with the result that the burr is effectively shaved off by the strip-driven rotating knives, typically in little curls or spirals as indicated in FIG. 2. Given the perpendicular direction of burr projection relative to the strip surface, the angular orientation of the planes of cutting edge rotation relative to that surface affords complete and assured burr removal.

Owing to the downstream location of the strip-knife contact points relative to the knife axes, and to the disposition of those axes laterally outwardly of the advancing strip, the directions 56 of knife rotation are such as to carry the burr shavings outwardly away from the strip, as desired to ensure that shavings will not be deposited and carried on the strip surface to downstream process line stations. Moreover, in the apparatus employing two devices 30 respectively on opposite sides of the strip, the directions 56 of knife rotation cooperatively pull the strip taut transversely between the units, thereby maintaining proper alignment of the strip edges for removal of the burr by the knives.

As will be appreciated, if the burr projected downwardly from the strip at the location of burr removal in the path of strip advance, the devices would be inverted and disposed below the strip, with their planes of rotation again oriented for contact of the cutting edges 48 with the burred strip edges at points downstream of the axes of knife rotation. Also, if the strip has a burr only on one side edge, only one of the devices 30 would be provided and/or operatively engaged with the strip.

The angular adjustment of the plane of cutting edge rotation permitted in each device 30 enables ready variation in the depth of edge cut. For example, if the knife edge just shaves the burr from a strip edge at a given angular orientation, an increase in angle will cause the knife edge 48 to cut into the advancing strip edge below the burr, leaving a bevelled or tapered strip edge as may be desired for particular purposes.

FIG. 6 illustrates an embodiment of the invention including four deburring devices of the type shown in FIGS. 4 and 5. Two of these devices (30, 30) are positioned to shave upwardly projecting burr from opposite side edges of a strip advancing in direction 28, while the other two devices (30', 30') are disposed to shave downwardly projecting burr from the side edges of such a strip. The two devices 30 and 30' on the left-hand side of the strip path are mounted on a first bracket 38' and the two devices 30 and 30' on the right-hand side of the path are mounted on a second bracket 38". A pair of parallel shafts 62, extending through sleeves 60 formed in the two brackets, support the brackets in a manner permitting them to be moved slidably toward and away from each other (for accommodating strips of different widths); means such as clamps (omitted from the drawing for simplicity) associated with the sleeves may be provided for releasably fixing the position of each bracket along the shafts 62, which are themselves supported in fixed end frames 64.

In the apparatus of FIG. 6, for trimming burr from aluminum strip, it is currently preferred to set the angle b of the upper devices 30, 30 at 5° and to set the angle b of the lower devices 30', 30' at 7.5°, with the angle a for all the cutters preferably in a range between about 10° and about 20°.

It is to be understood that the invention is not limited to the features and embodiments hereinabove specifically set forth but may be carried out in other ways without departure from its spirit.

I claim:

1. A method of removing burr from a longitudinal edge of a metal strip advancing continuously along a defined path, comprising
   (a) engaging said strip edge with an inwardly facing annular cutting edge of a rotary knife while
   (b) supporting the knife adjacent said path for rotation of the cutting edge about an axis disposed laterally outwardly of the path and in a plane of rotation obliquely intersecting said path such that the cutting edge engages the strip edge at a location beyond said axis in the direction of strip advance and the knife is rotated by the engagement of its cutting edge with the advancing strip edge at that location,
   (c) said knife cutting burr from the strip as it engages the strip edge at said location.

2. Apparatus for deburring metal strip, comprising, in combination with means for advancing a metal strip continuously along a defined path,
   (a) a rotary knife element having an inwardly facing annular cutting edge for cutting burr from an edge of a metal strip, and
   (b) means for freely rotatably mounting the knife element adjacent the path in a position for partially overlying an edge portion of a metal strip advancing in the path, with the cutting edge positioned for rotation about an axis disposed laterally outwardly of the path and in a plane of rotation intersecting the path obliquely such that the cutting edge engages a burr-bearing edge of an advancing metal strip in the path at a location beyond said axis in the direction of strip advance and said knife element is rotatably driven by the engagement of the cutting edge with the advancing strip edge in a direction for carrying burr, cut from the strip, outwardly away from the strip path.

3. Apparatus as defined in claim 2, wherein said knife element is disc-shaped and has a raised rim, said rim having an inner edge and being bevelled outwardly to expose and define the rim inner edge as the cutting edge.

4. Apparatus as defined in claim 2, wherein the mounting means is adjustable to vary the angular orientation of said plane of rotation relative to said path.

5. Apparatus as defined in claim 2, including two of said knife elements respectively disposed adjacent opposite sides of said path for respectively cutting burr from opposed longitudinal edges of a strip advancing in the path, and wherein said mounting means comprises means for mounting each of said knife elements as aforesaid.

* * * * *